(No Model.)
J. W. MILLER.
MACHINE FOR CLEANING WHEAT.
No. 366,235. Patented July 12, 1887.
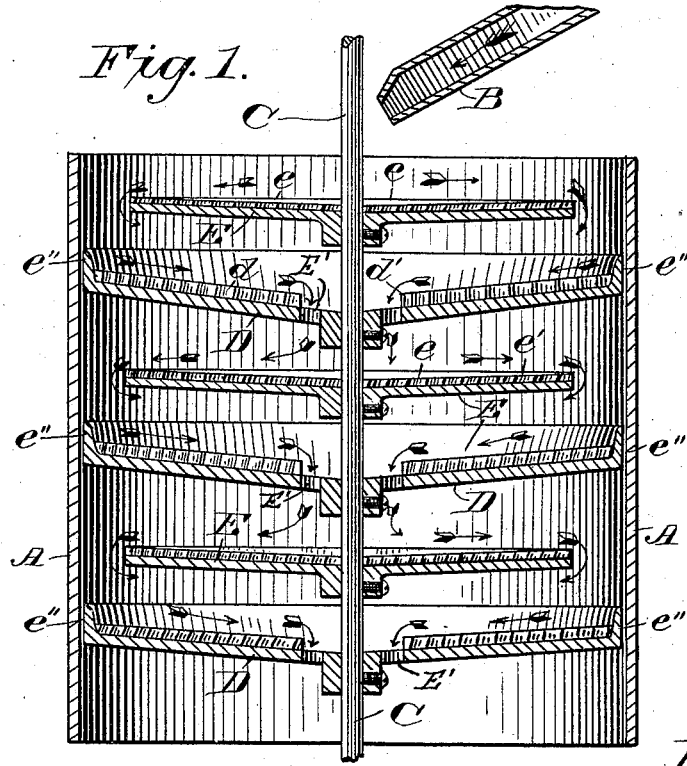
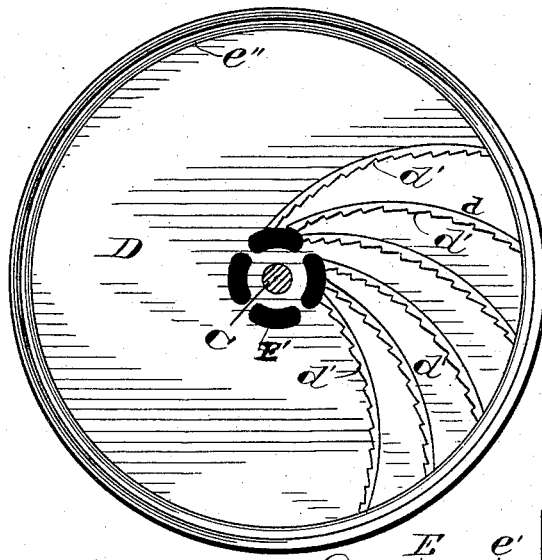
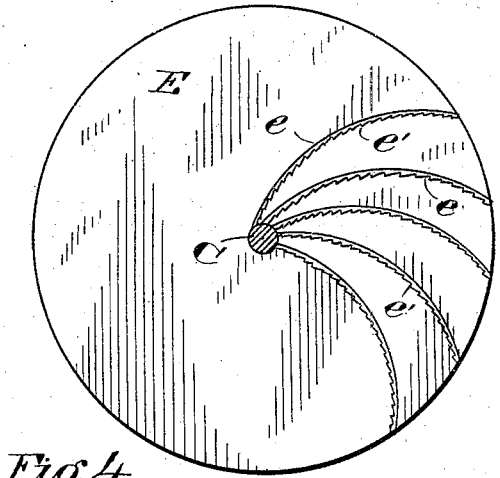
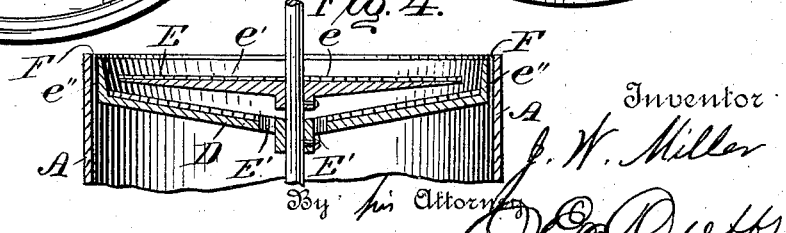
Witnesses
Wm. J. Danner
C. M. Werle
Inventor
J. W. Miller
By his Attorney

UNITED STATES PATENT OFFICE.

JOHN WM. MILLER, OF BURLINGTON, IOWA.

MACHINE FOR CLEANING WHEAT.

SPECIFICATION forming part of Letters Patent No. 366,235, dated July 12, 1887.

Application filed August 16, 1886. Serial No. 211,021. (No model.)

*To all whom it may concern:*

Be it known that I, JOHN WM. MILLER, of Burlington, in the county of Des Moines and State of Iowa, have invented certain new and useful Improvements in Machines for Cleaning Wheat; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to machines for scouring grain, and has for its object to improve the construction and operation of such machines.

It consists in the improved construction, arrangement, and combination of parts hereinafter fully described, and specifically pointed out in the claims.

In the drawings, Figure 1 is a vertical longitudinal section through a machine made in accordance with my invention. Fig. 2 is a top plan view of one of the larger flanged disks, which I denominate the "centripetal disks," a portion only of its toothed curved ribs being shown. Fig. 3 is a similar view of one of the smaller or "centrifugal" disks; and Fig. 4 is a central vertical section through a somewhat modified form of machine made according to my invention.

The same letters of reference mark the same parts in all the figures.

Referring to the drawings by letters, A is the casing of the machine, which is of cylindrical form, and B is a spout through which the grain empties into it. In the center, suitably stepped or journaled, is an upright shaft, C, which is rotated by any suitable gearing or belting, and which carries a series of disks of any desired number, as described. The series of disks D are all alike, and the corresponding alternating series of disks, E, are also duplicates, resting on the shaft B in the casing A in a horizontal position one above the other.

The disks D are what I denominate the "centripetal disks," and are provided with curved radiating ribs *d*, having on their sides teeth *d'*, which are shaped as saw-teeth, and have their teeth pointing to their centers. The disks are always of less diameter than the casing.

The disks E, I denominate the "centrifugal disks," having dished or concaved upper surfaces. They are provided with curved radiating ribs *e*, having teeth *e'*, said ribs and teeth being smaller and less prominent than those of the disks D. The disks D are provided at their peripheries with upward-projecting flanges *e''*, as shown in the drawings. The disks D and E being of less diameter than the casing A, it will, as the disks are rotated, give rise to a current of air, which finds an outlet through the air-passage F, as shown in Fig. 4.

In the construction shown in Fig. 1 the disks D are in diameter nearly equal to the interior diameter of the casing A, or just enough less to allow them to rotate singly therein, while in Fig. 4 I show them of somewhat less diameter, leaving a passage F between the flange *e''* and the casing. Near the center, disks D are perforated, as at E'.

The operation of my improved machine is as follows: The shaft being rotated, the grain is allowed to fall upon the upper disk, E, when, by reason of the centrifugal force, it will be thrown outward toward the circumference, engaging in its passage the teeth *e'* of the ribs *e*. In the form of the machine shown in Fig. 1 the grain will be thrown against the casing and drop down on the disk D, when, by virtue of the fact that it is dished or inclined to the center, the grain will pass inward, falling through the perforations E' onto the next disk E, when the operation is repeated and will be repeated as many times as there are pairs of disks in the construction. The disks are removably attached to the shaft, so that their number may be varied as desired by the operator or required by the grain being scoured.

In the construction shown in Fig. 4 the operation differs slightly, in that the grain thrown outward from disk E strikes the flange of disk D, which is made higher for that purpose, instead of striking the casing. In all other respects the operation is the same.

Having thus fully described my invention, what I claim as new, and desire to secure by Letters Patent, is—

1. A grain-scourer consisting, essentially, of the disks D and E, the shaft B, and the cylindrical casing A, said disks having on their upper surfaces curved radiating toothed ribs, as and for the purpose set forth.

2. The cylindrical casing A, in combination with the disks D and E and shaft B, the disks D having perforations E' and peripheral flanges e'', as and for the purpose set forth.

3. In combination, the cylindrical casing A, central vertical shaft, B, disks D and E, having curved radiating toothed ribs thereon, the disk D having perforation E' and peripheral flange e'', said disks being of less diameter than the casing, as and for the purpose set forth.

4. The cylindrical casing A, in combination with disks D and E and shaft B, said disks being concaved and having on their upper surfaces radiating curved toothed ribs, as described.

5. The cylindrical casing A, in combination with disks D and E and shaft B, said disks being of less diameter than the casing A, thereby forming the air-passage F, as described.

In testimony that I claim the foregoing as my own I affix my signature in presence of two witnesses.

JNO. WM. MILLER.

Witnesses:
C. P. DE HASS,
A. A. QUAKENBUSH.